…

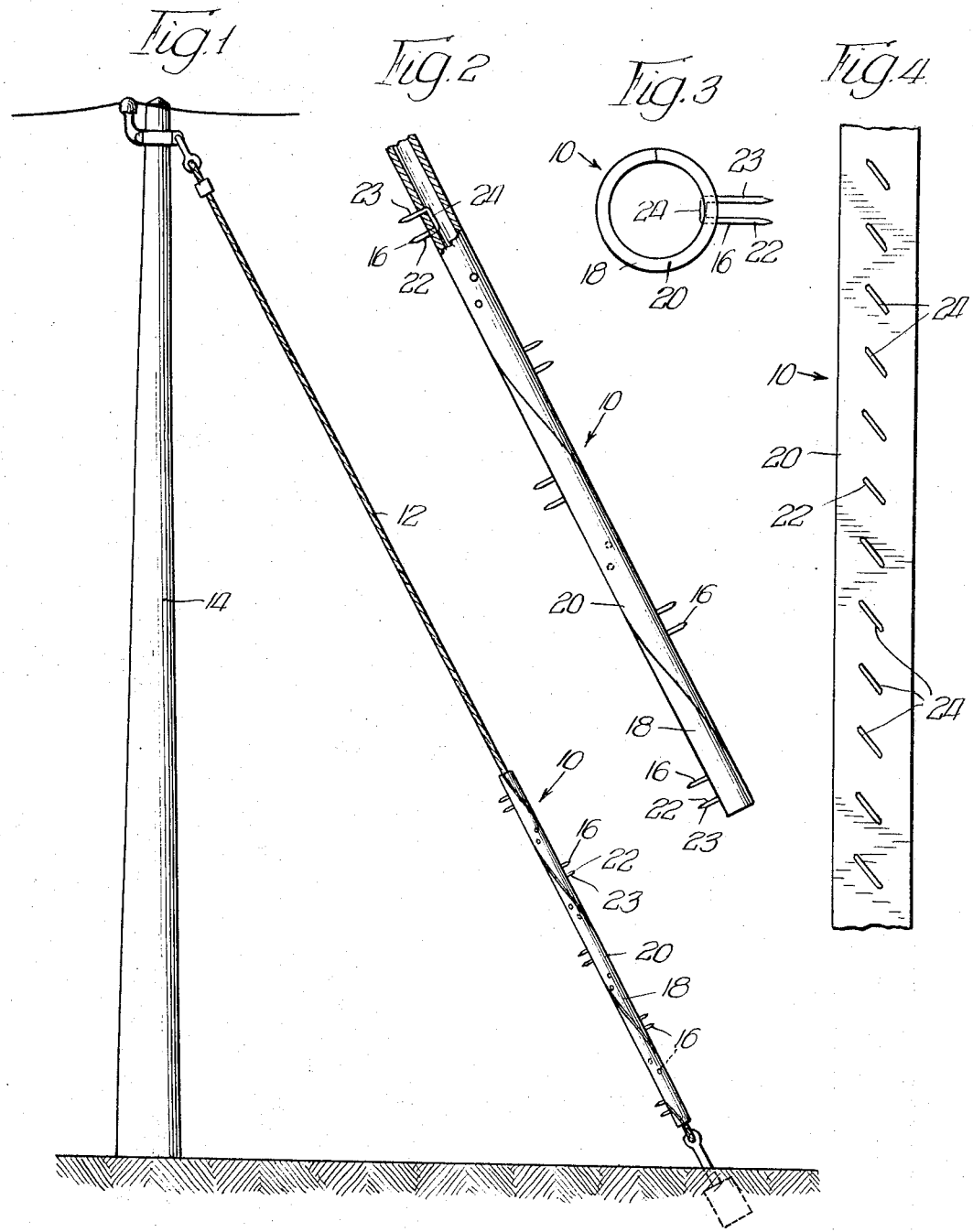
Jan. 9, 1968     C. D. NYHUS ET AL     3,362,115
ANIMAL DEFLECTOR FOR GUY WIRES AND METHOD OF FABRICATION
Filed May 11, 1965
Inventors:
Carl D. Nyhus,
William Mockel.

United States Patent Office 3,362,115
Patented Jan. 9, 1968

3,362,115
ANIMAL DEFLECTOR FOR GUY WIRES AND METHOD OF FABRICATION
Carl D. Nyhus and William Mockel, both of 606 Judy Ave., Harvey, N. Dak. 58341
Filed May 11, 1965, Ser. No. 454,847
5 Claims. (Cl. 52—101)

ABSTRACT OF THE DISCLOSURE

An animal guard appliance having an elongated hollow cylindrical plastic base adapted to helically apply over and enclose a guy wire. A multiplicity of staples project outwardly from the base and are both radially and longitudinally spaced over the base to repel cattle. The base provides the sole attachment of the animal guard to the guy wire. The animal guard is formed by helically slitting a cylindrical tube to form a single elongated helical strip of material, by passing this strip linearly through a stapler by forcibly opening the helix and serially linearly stapling the strip as the strip passes through the stapler, then by releasing the strip so that it returns to a tubular configuration with the staples helically distributed on the tube.

---

The present invention relates to protective devices for linear bodies and in particular to a novel appliance for a linear body such as a line pole guy wire which prevents animals from disturbing the linear body.

Animals such as grazing cattle frequently resort to man-made structures for scratching their hides. For example, down-guys from power or telephone line poles, because of their suitable angular position and height above the ground, are frequently used by animals for this purpose. This has created a serious problem for the utility companies in that these animals exert large forces upon the guy wire strands which can cause failure of the terminating devices at the anchor end or the pole top end of the guy. An equally serious problem occurs when the rocking motion of the scratching animal sets up movements, including harmonic movements, in the line pole. Among the damaging results which can occur therefrom are loosening of the pole mounting and swaying of the electrical lines. The latter can cause shorting or burndown of the conductors.

It is an object of the present invention to provide an appliance for linear bodies which effectively overcomes the above stated problem.

It is a general object of the present invention to provide a low-cost, lightweight and effective animal guard appliance for a linear body which is easily installed and does not detract from the function or appearance of the linear body.

It is a further object of the invention to provide a novel method for manufacturing animal guard appliances for a linear body.

It is a specific object of the invention to provide a tubular animal guard appliance which fits over and removably but securely grips a segment of a guy wire or the like and which has a substantial plurality of tines projecting outwardly therefrom to repel cattle or other animals from the guy wire.

Further objects and features of the invention pertain to the particular arrangements and structure whereby the above objects and other objects of the invention are attained. The invention, both as to its structure and mode of operation, will be better understood by reference to the following disclosure and the drawings forming a part thereof, wherein:

FIGURE 1 shows an animal guard appliance in accordance with the invention, as installed on a guy for an electrical or telephone line pole;

FIGURE 2 is an enlarged side view of a segment of the animal guard appliance of FIGURE 1;

FIGURE 3 is an end view of the appliance of FIGURE 1; and

FIGURE 4 shows a plan view of the appliance of FIGURE 1 as it appears when untwisted into a linear and planar configuration.

Turning to the drawings, and to FIGURE 1 in particular, there is shown therein an animal guard appliance 10 secured over (by way of example) a guy wire 12 supporting a line pole 14. The appliance 10 comprises a tubular base 18 resiliently enclosing and gripping the guy wire 12 over a sufficient segment of the guy wire to protect the line pole installation by warding off cattle or other animals by means of tines 16 fastened to and extending out from the tubular base 18.

Referring in further detail to the appliance 10, the tubular base 18 is preferably an elongate cylindrical hollow tube of resilient plastic or other suitable flexible yet resilient material having a normal (unstressed) internal diameter which is less than the exterior diameter of the guy wire 12. The base 18 is preferably formed by a single elongate unitary strip 20 of the above described material in a closed helical configuration. A normal unstressed configuration is shown in FIGURES 2 and 3. The base 18 is preferably relatively thinwalled and lightweight and relatively flexible with respect to its longitudinal axis, so as to be able to enclose the guy wire 12 without adding any significant weight to the guy wire or increasing its dimensions, and without interfering in any manner with the guy wire curvature or flexibility.

The length of the tubular base 18 will necessarily depend on the particular application and the particular linear body. It has been found that for cattle and for conventional line pole guys that an appliance approximately 36 inches in length is appropriate, mounted on the guy wire above the ground level.

Preferably the base 18 is constructed of a bright colored plastic or is brightly colored on its exterior surface. This makes the appliance easily visible to humans and assists in preventing them from running into the appliance or the guy wire itself. However, as the appliance does not add significantly to the normal diameter of the guy wire, no unsightly appearance is created.

A closed helix configuration of the strip 20 is preferred over an open helix in that with a closed helix the maximum surface area of the guy wire segment enclosed by the appliance is contacted, providing a more positive securing of the appliance. Also a stronger and more rigid mounting is provided for the tines 16 by a closed helix configuration in that tangential forces applied to the tines are less able to cause twisting of the strip 20, as the strip 20 has a maximum width and is closely spaced from itself at its edges.

The tines 16 are preferably secured through the base 18 so as to extend radially outwardly from the base, and therefor radially outward from the guy wire. Preferably, for maximum protection, the tines are spaced both circumferentially and longitudinally over substantially the entire surface of the base 18. A substantial quantity of the tines 16 are preferred, and the tines should be adequate in length, rigidity, sharpness, etc. to repel cattle effectively, yet the tines should not be so long as to represent a substantial hazard to humans.

It has been found that one very effective and low cost method for forming the tines 16 is to employ conventional staples 22, or metal wire formed to a staple (U-shaped) configuration. The two prongs 23 of each staple 22 (preferably less than ½ inch in length) may be fully inserted through the base 18 from the inside thereof so that the prongs 23 project outwardly from the base to form the tines 16. The central portion 24 of the staple is then lying against the inside surface of the base 18, effectively retaining the staple. When the appliance is secured over the guy wire 12, this central portion 24 is compressed between the inside surface of the base 18 and the guy wire 12, adding further retention.

A preferred novel means for forming a cattle guard appliance is described herein. The desired closed helical configuration is preferably provided by taking a conventional uninterrupted hollow tubing of the proper diameter and helically cutting or slitting through one wall thereof so as to form an even helical cut along the tube. This cuts the tube into the continuous elongate strip 20. The novel means by which the tines are then preferably secured to the base 18 (using staples 22 for example) is to pass the strip 20 linearly through a station having a staple inserting device. Linear and non-rotatable movement of the strip through this tine attaching station is preferably accomplished by causing the helical configuration to be forcibly opened at the station. Thus the strip 20 may be passed evenly through the stapling device with the same side continuously exposed, and the staples may be rapidly sequentially placed perpendicularly into the strip, serially spaced along the entire strip (preferably generally in the central region of the strip). All of the staples are thus placed generally in a single line only, which would not be desirable for a completed animal guard appliance. However, simply be the strip 20 being released after the insertion of the staples the resiliency of the strip material will restore the strip into the helical configuration. Upon so doing, the tines 16 are placed in a helical pattern over the surface of the base 18, extending radially therefrom. Therefor the tines 16 are spaced both circumferentially and longitudinally over the base, providing protection to the linear body from all directions.

Turning to the installation and operation of the appliance 10, the appliance is adapted to firmly secure itself to the guy wire 12 without requiring any fastening means or application tools whatsoever. Preferably the sole means of attachment is by the resilient gripping provided by the tubular base 18 itself. This self-gripping force is sufficient to hold the appliance at a fixed position upon the guy wire 12, preventing both longitudinal and rotational movement therewith even if the appliance is subjected to substantial external forces.

The retentive force by which the tubular base 18 grips the guy wire is preferably provided by the normal unstressed interior diameter of the base 18 being forced to a larger diameter when it is in place on the guy wire. The unstressed interior diameter is the effective internal diameter, taking into account the portions of the staples inside the helix. This expansion in diameter is allowed by the helical configuration, and the helical form opens somewhat in so doing. However, the base material resists untwisting from the normal closed helical configuration and the resilient nature of the material provides a counter-force tending to pull the strip 20 tightly around the exterior of the guy wire 12, providing the necessary gripping. Further, the nature of the helical configuration causes this gripping force to be increased when a longitudinal force is applied to the appliance.

Application of the appliance 10 is easily accomplished without requiring the use of any tools. The base 18 may be twisted to open at least a portion of the helix and the appliance then placed over the guy wire and twisted or wrapped until the entire base 18 surrounds the guy wire. This is readily accomplished due to the flexible nature of the strip 20.

Once installed, the appliance 10 provides a long-lasting, safe and effective protective device for the guy wire 12 and it may be easily removed at any time in the same manner in which it was installed. The tines 16 effectively discourage animals from even attempting to rub against the guy wire.

It is clear that there has been described herein a novel, inexpensive, and effective appliance for protecting linear bodies such as guy wires from animal disturbance, which appliances are easily installed and do not interfere with the operation of the linear bodies, which appliances may be constructed by a novel manufacturing process. While the apparatus and methods described herein are presently considered to be preferred, it is contemplated that further variations and modifications within the purview of those skilled in the art can be made herein, and it is intended to cover in the claims all such variations and modifications as fall within the true spirit and scope of the invention.

What is claimed is:

1. A method for forming an animal guard appliance for a linear body comprising the steps of: helically slitting a cylindrical tube of resilient material so as to form an elongate strip of said material in a closed helix having the configuration of said cylindrical tube; passing said elongate strip linearly and non-rotatably through a tine attaching station by forcibly opening said helix at said station; serially and linearly attaching tines to said strip as said strip passes through said station so that said tines project from said strip; and releasing said strip so as to allow said strip to return to a cylindrical tubular configuration, whereby said tines are helically distributed on said tube said animal guard appliance being helically appliable over said linear body.

2. The method of claim 1 wherein a stapling operation is performed at said tine attaching station of fastening staples through said strip to form said tines.

3. An animal guard appliance disposed about a guy wire comprising an elongated hollow tubular base enclosing said guy wire, said base being formed by an elongate unitary strip of resilient material in a closed twisted helical configuration, and a multiplicity of tines secured to said base and projecting radially outward therefrom, said tines being both radially and longitudinally spaced over said base and adapted to repel cattle, said base providing the sole attachment of said animal guard to said guy wire.

4. The animal guard of claim 3 wherein said tines are formed by staples which are applied through said base with their prongs projecting outwardly therefrom, said staples being linearly spaced along said unitary strip and helically spaced on said tubular base.

5. The animal guard of claim 3 wherein said base has an unstressed internal diameter less than the diameter of said guy wire, said base when applied to said guy wire being partially untwisted and frictionally gripping said base to said guy wire.

References Cited

UNITED STATES PATENTS

| 727,054 | 5/1903 | Arndt | 52—101 X |
| 2,877,730 | 5/1959 | Bittner | 256—11 X |
| 3,251,161 | 5/1966 | Stirn | 52—147 |

OTHER REFERENCES

Electrical World, Oct. 5, 1964, Scientific Library, p. 122 only relied on.

JOHN E. MURTAGH, *Primary Examiner.*